(12) United States Patent
Shin et al.

(10) Patent No.: US 8,581,867 B2
(45) Date of Patent: Nov. 12, 2013

(54) TOUCH SENSOR DEVICE

(75) Inventors: Young-Ho Shin, Yongin-si (KR);
Jei-Hyuk Lee, Yongin-si (KR);
Bang-Won Lee, Yongin-si (KR);
Chul-Yong Joung, Yongin-si (KR);
Sang-Jin Lee, Yongin-si (KR); Jae-Surk Hong, Yongin-si (KR); Ju-Min Lee, Yongin-si (KR); Duck-Young Jung, Yongin-si (KR)

(73) Assignee: Atlab Inc. (KR)

( * ) Notice: Subject to any disclaimer, the term of this patent is extended or adjusted under 35 U.S.C. 154(b) by 207 days.

(21) Appl. No.: 13/124,039

(22) PCT Filed: Mar. 25, 2009

(86) PCT No.: PCT/KR2009/001515
§ 371 (c)(1),
(2), (4) Date: Apr. 13, 2011

(87) PCT Pub. No.: WO2010/047445
PCT Pub. Date: Apr. 29, 2010

(65) Prior Publication Data
US 2011/0199327 A1   Aug. 18, 2011

(30) Foreign Application Priority Data
Oct. 24, 2008   (KR) .................. 10-2008-0104951

(51) Int. Cl.
*G06F 3/041* (2006.01)
(52) U.S. Cl.
USPC ........................................... 345/173
(58) Field of Classification Search
USPC ........................................... 345/173
See application file for complete search history.

(56) References Cited

U.S. PATENT DOCUMENTS

| 2003/0067451 | A1* | 4/2003 | Tagg et al. | 345/174 |
| 2004/0178998 | A1* | 9/2004 | Sharp et al. | 345/177 |

(Continued)

FOREIGN PATENT DOCUMENTS

| JP | 58-10335 | 1/1983 |
| JP | 05-189151 | 7/1993 |

(Continued)

OTHER PUBLICATIONS

International Search Report—PCT/KR2009/001515 dated Nov. 24, 2009.

(Continued)

*Primary Examiner* — William Boddie
*Assistant Examiner* — Sahlu Okebato
(74) *Attorney, Agent, or Firm* — Cantor Colburn LLP

(57) ABSTRACT

A touch sensor device is provided. The touch sensor device includes a touch panel including a plurality of touch mark-keys indicating a position touched by a touch object, a plurality of first touch pads disposed at positions corresponding to the plurality of touch mark-keys of the touch panel and generating touch information of the touch object as a first electrical signal, a plurality of second touch pads disposed between the plurality of first touch pads and generating touch information of a conductive material on the touch object as a second electrical signal, and a touch sensing unit receiving the first electrical signal, outputting a plurality of sensing signals to allow an electronic device to perform predetermined operations corresponding to the touched touch mark-keys, and determining whether the touch of the touch object is a normal one using the first and second electrical signals.

25 Claims, 10 Drawing Sheets

(56) References Cited

U.S. PATENT DOCUMENTS

| | | | |
|---|---|---|---|
| 2005/0248543 A1* | 11/2005 | North et al. ................ | 345/173 |
| 2006/0007181 A1 | 1/2006 | Jung et al. | |
| 2006/0154689 A1 | 7/2006 | Griffin et al. | |
| 2007/0152976 A1* | 7/2007 | Townsend et al. .......... | 345/173 |
| 2007/0268265 A1* | 11/2007 | XiaoPing ................... | 345/173 |
| 2008/0204422 A1 | 8/2008 | Moon et al. | |

FOREIGN PATENT DOCUMENTS

| | | |
|---|---|---|
| JP | 05-224818 | 9/1993 |
| KR | 10-2006-0041576 | 5/2006 |
| KR | 10-2006-0101821 | 9/2006 |
| KR | 10-2006-0131579 | 12/2006 |
| KR | 10-2008-0064100 | 7/2008 |
| TW | 200517967 | 6/2005 |
| TW | 200701639 | 1/2007 |
| WO | 2007/148873 | 12/2007 |

OTHER PUBLICATIONS

Written Opinion—PCT/KR2009/001515 dated Nov. 24, 2009.
Korean Decision of Grant—Korean Application No. 10-2008-0104951 issued Jul. 8, 2010.
Korean Office Action—Korean Application No. 10-2008-0104951 issued Feb. 19, 2010.
Japanese Office Action—Japanese Application No. 2011-533090, issued on Mar. 19, 2013.
Taiwanese Notice of Allowance—Taiwanese Application No. 098111057 issued on Dec. 20, 2012.
Taiwanese Search Report—Taiwanese Application No. 098111057 issued on Dec. 17, 2012.

* cited by examiner

TOUCH SENSOR DEVICE

TECHNICAL FIELD

The present invention relates to a touch sensor device, and more particularly, to a touch sensor device which can prevent a touch sensor device from malfunctioning due to an abnormal touch.

BACKGROUND ART

A touch pad is a data input device including a plurality of sensing points arranged in a matrix shape on a plane and capable of detecting a point touched by a user and a direction in which the touched point moves, and is thus widely used in place of a mouse. There are various types of touch pads including touch pads in which electrical switches are arranged in a plane, and touch pads in which capacitive sensors, resistive sensors, surface acoustic wave sensors, or optical sensors are arranged in a plane.

Among them, a touch panel comprising a plurality of touch pads using the capacitive sensors is widely used to control the movement of a cursor on a notebook computer. The surface of the touch panel is covered by an insulating layer, and horizontal lines and vertical lines are arranged at regular intervals below the insulating layer. The horizontal line and the vertical line are used to measure capacitance as an electrical equivalent circuit, in which the horizontal line is a first electrode and the vertical line is a second electrode.

When a conductive object such as a finger is in contact with a sensing surface, an electrostatic capacitance existing in the horizontal line and the vertical line has a different value from that in the other lines that are not in contact with the conductive object. For example, a voltage signal is applied to the horizontal line, and the voltage induced on the vertical line is measured to detect a change in electrostatic capacitance of the capacitor, thus determining which portion of the sensing surface is in contact with the conductor.

Another type of touch panel, a resistive 2D matrix touch panel, has a structure in which an electrical conductor is disposed in two-layer films and a minute space is formed between the two layers such that the two layers are not short-circuited. When a user touches a specific area with his or her finger, the conductors of the two layers located in the corresponding touch area are short-circuited with each other, and thus the touch panel detects a potential or current in the short-circuited area, thus determining the coordinates of the corresponding conductors.

At this time, a binary signal interpreted as either on or off is generated to indicate whether the conductors are short-circuited, and a plurality of binary signals are distributed around the touch area as large as the finger to allow the touch panel to determine the coordinates of the specific touch area.

Such touch panels are widely used in portable communication devices such as mobile phones, personal digital assistants (PDAs), portable media players (PMPs), etc. and electric household appliances such as kitchen appliances and humidifiers as well as notebook computers, navigation systems for vehicles, etc.

However, in the case where the finger is used to touch the touch panel, water present on the finger may drip onto the touch panel, and if the area thus contacted is large, a plurality of touch pads may be contacted. Here, the touch sensor device cannot determine an accurate touch position of the touch object.

FIG. 1 is a cross-sectional view of a portion of a conventional touch sensor device that may malfunction, in which a conductive material 5, a touch panel 10, a plurality of touch mark-keys B11 and B12 to BN1 and BN2, a plurality of touch pads 1P-11 and 1P-12 to 1P-N1 and 1P-N2, and a touch sensor 20 are provided. The plurality of touch mark-keys B11 and B12 to BN1 and BN2 are mounted on the top of the touch panel 10, and the plurality of touch pads 1P-11 and 1P-12 to 1P-N1 and 1P-N2 are mounted on the bottom of the touch panel 10.

The malfunction of the conventional touch sensor device will be described below with reference to FIG. 1.

For example, it is assumed that a user intends to select a desired function by touching a specific touch key B11 among the plurality of touch mark-keys B11 and B12 to BN1 and BN2 on the touch panel 10 of an electric rice cooker with his or her wet finger.

However, since the water on the finger is the conductive material 5, touch signal is also applied to an adjacent touch key B12 in addition to the specific touch key B11, and thus the touch sensor device determines that a touch object is in contact with both touch pads 1P-11 and 1P-12.

Therefore, the touch panel 10 receives touch information of the finger as the touch object from the two touch pads 1P-11 and 1P-12 and generates electrical signals sig2-11 and sig2-13 corresponding thereto, and the touch sensor 20 receiving the electrical signals sig2-11 and sig2-13 through the two touch pads 1P-11 and 1P-12 detects the positions of the two touch pads 1P-11 and 1P-12 and outputs the changes in electrical state as sensing signals s_sig11 and s_sig13, thereby causing malfunction.

Moreover, as another malfunction of the conventional touch sensor device, the touch object may touch the plurality of touch pads 1P-11 and 1P-12 to 1P-N1 and 1P-N2 only briefly but still exceed a predetermined time. For example, the user may sequentially touch the plurality of touch mark-keys B11 and B12 to BN1 and BN2 while brushing a duster across the touch mark-keys to remove foreign substances from the touch mark-keys on an electric household appliance.

However, although the user intends only to remove the foreign substances from a specific touch key, touch signal is also applied from the user's body to adjacent touch mark-keys, and thus the touch sensor device determines that the touch object is in contact with the corresponding touch mark-keys contrary to the user's intention.

Thus, the touch panel 10 receives touch information of the touch object from the touch pads connected to the specific touch key and the adjacent touch mark-keys and generates electrical signals corresponding thereto. Then, the touch sensor 20 receives the electrical signals through the corresponding touch pads, detects the positions of the corresponding touch pads, and outputs the changes in electrical state as electrical signals. As a result, the functions corresponding to the touch mark-keys are performed regardless of the user's intentions, thus causing malfunction.

DISCLOSURE

Technical Problem

It is, therefore, an object of the present invention to provide a touch sensor device which detects an abnormal touch of a touch pad using a hidden touch pad or using a touch time of the touch pad.

Another object of the present invention is to provide a touch sensor device which reduces abnormal touch of a touch pad.

Still another object of the present invention is to provide a method of determining pointing coordinates of a pointing device using a touch sensor device for achieving the above objects.

Technical Solution

In accordance with one aspect of the present invention, there is provided a touch sensor device including: a touch panel including a plurality of touch mark-keys indicating a position touched by a touch object; a plurality of first touch pads disposed at positions corresponding to the plurality of touch mark-keys of the touch panel and generating touch information of the touch object as a first electrical signal; a plurality of second touch pads disposed adjacent the plurality of first touch pads and generating touch information of a conductive material on the touch object as a second electrical signal; and a touch sensing unit receiving the first electrical signal, outputting a plurality of sensing signals to allow an electronic device to perform predetermined operations corresponding to the touched touch mark-keys, and determining whether the touch of the touch object is a normal one using the first and second electrical signals.

In accordance with another aspect of the present invention, there is provided a touch sensor device including: a touch panel including a touch pattern in which a plurality of touch pads are connected in series by a connecting line; a touch delay time processor generating and applying a clock signal to one end of the touch pattern, generating a pulse measurement digital signal by receiving a delay measurement digital signal delayed while passing through the plurality of touch pads from the other end of the touch pattern, and outputting a delay time difference between the pulse measurement digital signal and the clock signal; a delay time threshold value storage unit storing touch delay time threshold values of the plurality of touch pads to be compared with actual touch delay times and the delay time difference during touch of a touch object; and a normal touch determination unit detecting an order in which the plurality of touch pads are temporally touched by receiving the delay time difference and comparing the delay time difference with the touch delay time threshold values, detecting a position of the touch pad which is first touched, and outputting touch position data.

In accordance with still another aspect of the present invention, there is provided a touch sensor device including: a touch panel including a touch pattern in which a plurality of touch pads are connected in series by a connecting line; a touch delay time processor generating and applying a measurement digital signal to one end of the touch pattern, generating a pulse measurement digital signal by receiving a delayed measurement digital signal delayed while passing through the plurality of touch pads from the other end of the touch pattern, and outputting a delay time difference between the pulse measurement digital signal and the measurement digital signal; a delay time threshold value storage unit storing touch delay time threshold values of the plurality of touch pads to be compared with actual touch delay times and the delay time difference during touch of a touch object; and a normal touch determination unit selecting a touch pad in which the delay time exceeds the touch delay time threshold value and is maintained for a predetermined time by receiving the touch delay time threshold values and comparing the touch delay time threshold values with the delay times, detecting a position of the touch pad which is first touched, and outputting touch position data.

Advantageous Effects

The touch sensor device in accordance with the present invention prevents malfunction by accurately detecting an abnormal touch of a touch object and improves reliability of its operation by reducing the abnormal touch and reducing unnecessary power consumption.

MODE FOR INVENTION

Hereinafter, a touch sensor device and a method for determining pointing coordinates in accordance with exemplary embodiments of the present invention will be described with reference to the accompanying drawings.

Figure 2:
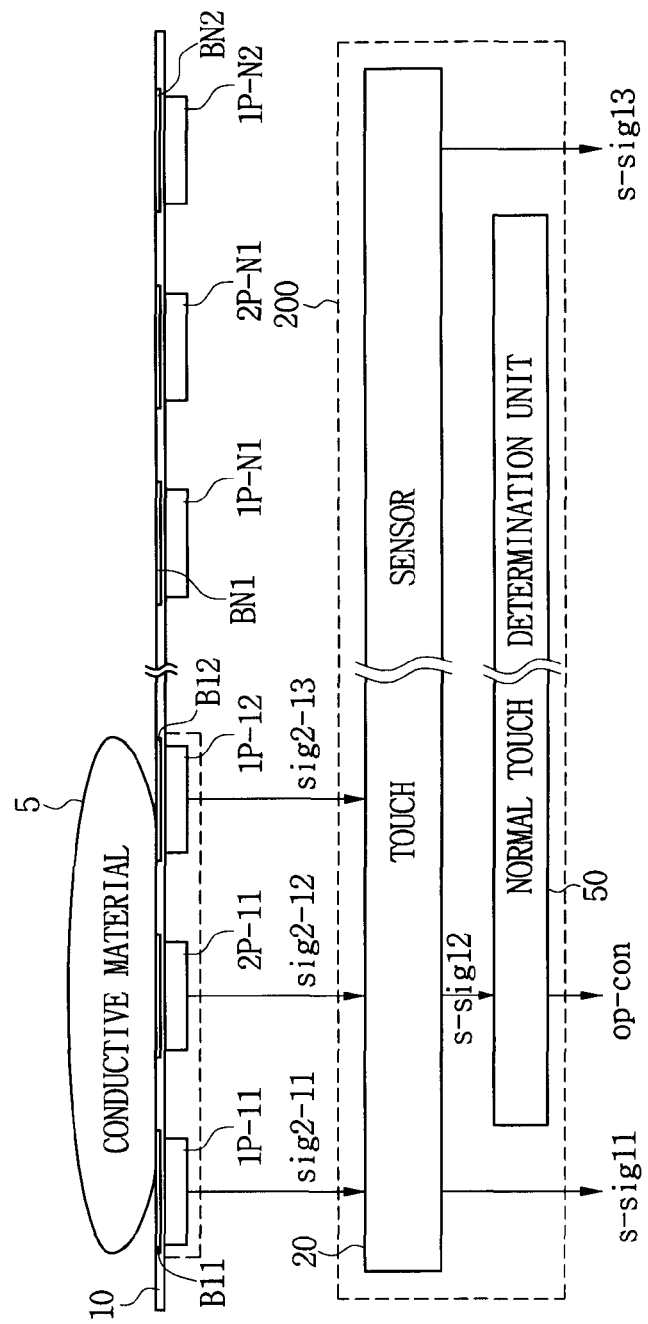
FIG. 2 is a cross-sectional view of a portion of a touch sensor device in accordance with an exemplary embodiment of the present invention.

FIG. 2 is a cross-sectional view of a portion of a touch sensor device in accordance with an exemplary embodiment of the present invention, in which a conductive material 5, a touch panel 10, a plurality of touch mark-keys B11 and B12 to BN1 and BN2, a plurality of touch pads 1P-11 and 1P-12 to 1P-N1 and 1P-N2, and 2P-11 to 2P-N1, and a touch sensing unit 200 including a touch sensor 20 and a normal touch determination unit 50 are provided.

The plurality of touch mark-keys B11 and B12 to BN1 and BN2 are mounted on the top of the touch panel 10, and the plurality of touch pads 1P-11 and 1P-12 to 1P-N1 and 1P-N2, and 2P-11 to 2P-N1 are mounted on the bottom of the touch panel 10. The plurality of touch pads comprises a plurality of first touch pads 1P-11 and 1P-12 to 1P-N1 and 1P-N2 to which the touch mark-keys B11 and B12 to BN1 and BN2 are attached, respectively, and a plurality of second hidden touch pads 2P-11 to 2P-N1 to which no touch mark-keys are attached.

Figure 1:
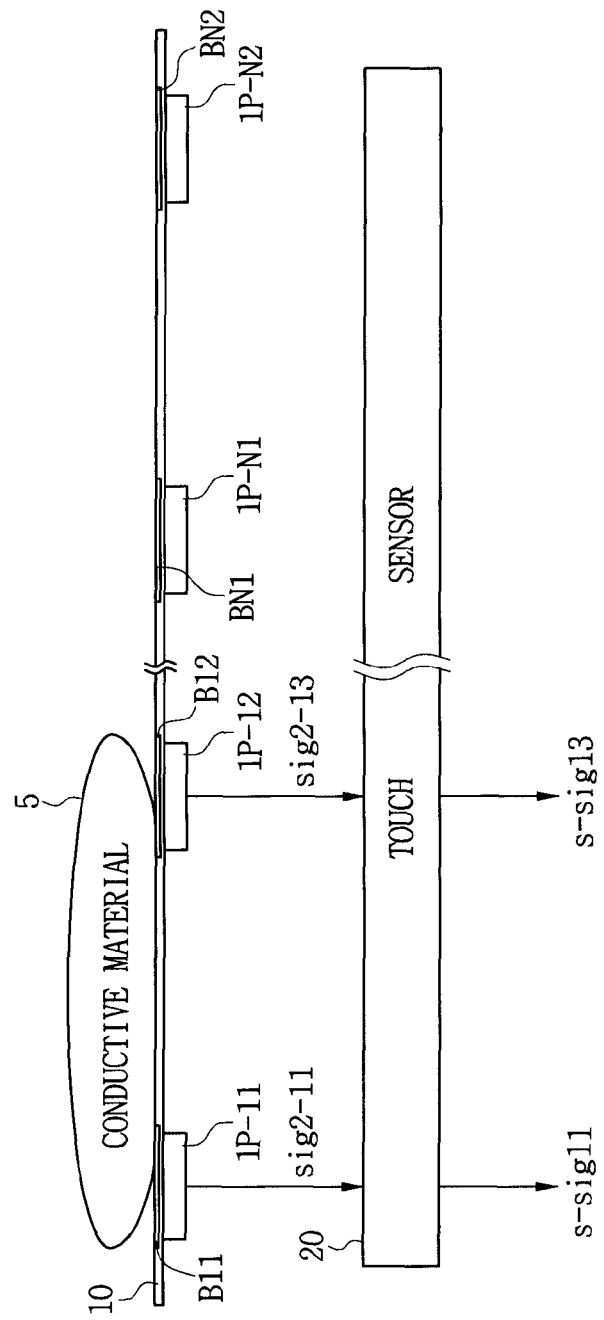
FIG. 1 is a cross-sectional view of a portion of a conventional touch sensor device which may malfunction.

The difference from the conventional touch sensor device shown in FIG. 1 is that the hidden touch pads 2P-11 to 2P-N1 are attached to the bottom of the touch panel 10 to which no touch mark-keys are attached.

The function of each component of the touch sensor device in accordance with the present invention will be described with reference to FIG. 2 below.

The plurality of touch mark-keys B11 and B12 to BN1 and BN2 are touched by a touch object in order to select a desired function of an electronic device and deliver touch signal of the touch object.

The plurality of first touch pads 1P-11 and 1P-12 to 1P-N1 and 1P-N2 receive the touch signal of the touch object from the plurality of touch mark-keys B11 and B12 to BN1 and BN2 and generate the corresponding touch information as first electrical signals sig2-11 and sig2-13 to sig2-N1 and sig2-N3.

Since the touch signal is delivered to an adjacent touch mark-key B12 in addition to a specific touch mark-key B11, which the touch object is intended to touch, due to the conductive material 5 interposed between the plurality of touch mark-keys B11 and B12 to BN1 and BN2, the plurality of second touch pads 2P-11 to 2P-N1 determine that the unintended touch pads are simultaneously touched by the touch object and generate second electrical signals sig2-12 to sig2-N2.

The touch sensing unit 200 detects the touch object by receiving the first electrical signals sig2-11 and sig2-13 and the second electrical signals sig2-12 from the plurality of first touch pads 1P-11 and 1P-12 and the second touch pad 2P-11 and generates sensing signals s_sig11 to s_sig13 so that the electronic device performs predetermined functions of the touched touch mark-keys B11 and B12. In the case where the first electrical signals sig2-11 and sig2-13 are applied from the plurality of first touch pads 1P-11 and 1P-12 and the second electrical signal sig2-12 is applied from the second touch pad 2P-11, the touch sensing unit 200 determines that the unintended adjacent touch mark-key B12 is abnormally touched together with the specific touch mark-key B11 and outputs an operation control signal op_con to ignore the plurality of first electrical signals sig2-11 and sig2-13 such that the predetermined functions of the touched touch mark-keys B11 and B12 are not performed.

The operation of the touch sensor device in accordance with the present invention will be described below with reference to FIG. 2.

First, it is assumed that a "keep-warm" touch mark-key B11 and a "cooking" touch mark-key B12 are located adjacent to each other, and a user intends to select a desired "keep-warm" function by touching the "keep-warm" touch mark-key B11 among the plurality of touch mark-keys B11 and B12 to BN1 and BN2 on the touch panel 10 of an electric rice cooker with his or her wet finger.

The "keep-warm" touch mark-key B11 is touched by the wet finger of the user who intends to select the "keep-warm" function of the electric rice cooker and delivers touch signal of the user's body. At this time, since the "cooking" touch mark-key B12 is located adjacent to the "keep-warm" touch mark-key B11, the water on the finger is covered to the "cooking" touch mark-key B12 such that the touch signal is also delivered to the "cooking" touch mark-key B12.

The first touch pad 1P-11 attached to the "keep-warm" touch mark-key B11 and the first touch pad 1P-12 attached to the "cooking" touch mark-key B12 receive the touch signal of the user's body through the touch mark-keys B11 and B12 and generate the touch information corresponding thereto as the first electrical signals sig2-11 and sig2-13.

Moreover, the hidden second touch pad 2P-11, to which no touch mark-key is attached, located between the "keep-warm" touch mark-key B11 and the "cooking" touch mark-key B12 generates the second electrical signal sig2-12 since it is determined that the unintended "cooking" first touch pad 1P-12 is touched together with the second touch pad 2P-11 as the touch signal is delivered to the adjacent "cooking" touch mark-key B12 in addition to the intended "keep-warm" touch mark-key B11 due to the conductive material 5 interposed between the touch mark-keys B11 and B12.

However, in the case where the plurality of first electrical signals sig2-11 and sig2-13 are applied from the plurality of first touch pads 1P-11 and 1P-12 and the second electrical signal sig2-12 is applied from the second touch pad 2P-11, the touch sensing unit 200 receives the second electrical signal sig2-12 from the hidden second touch pad 2P-11, to which no touch mark-key is attached, and determines that the unintended adjacent touch mark-key B12 is abnormally touched together with the specific touch mark-key B11. Thus, the touch sensing unit 200 ignores the first electrical signals sig2-11 and sig2-13 applied from the "keep-warm" first touch pad 1P-11 and the "cooking" first touch pad 1P-12 and outputs an operation control signal op_con so that the electric rice cooker does not perform the input operations.

If receiving the first electrical signal sig2-11 from the "keep-warm" first touch pad 1P-11 and the second electrical signal sig2-12 from the second touch pad 2P-11, or if receiving the first electrical signal sig2-13 from the "cooking" first touch pad 1P-12 and the second electrical signal sig2-12 from the second touch pad 2P-11, the touch sensing unit 200 detects the user's finger touching the touch mark-key B11 or B12 and outputs a sensing signal s_sig11 or s_sig13 so that the electric rice cooker performs the function corresponding to the touched "keep-warm" touch mark-key B11 or "cooking" touch mark-key B12.

As such, the touch sensor device in accordance with the exemplary embodiment of the present invention prevents malfunction due to the abnormal touch of the touch mark-key B12 using the hidden second touch pad 2P-11 to which no touch mark-key is attached. For simplicity of description, the hidden second touch pad 2P-11 is located between the first touch pads 1P-11, 1P-12. But, it is natural to place the hidden second touch pad 2P-11 at appropriate location to detect the abnormal operation.

Figure 3:
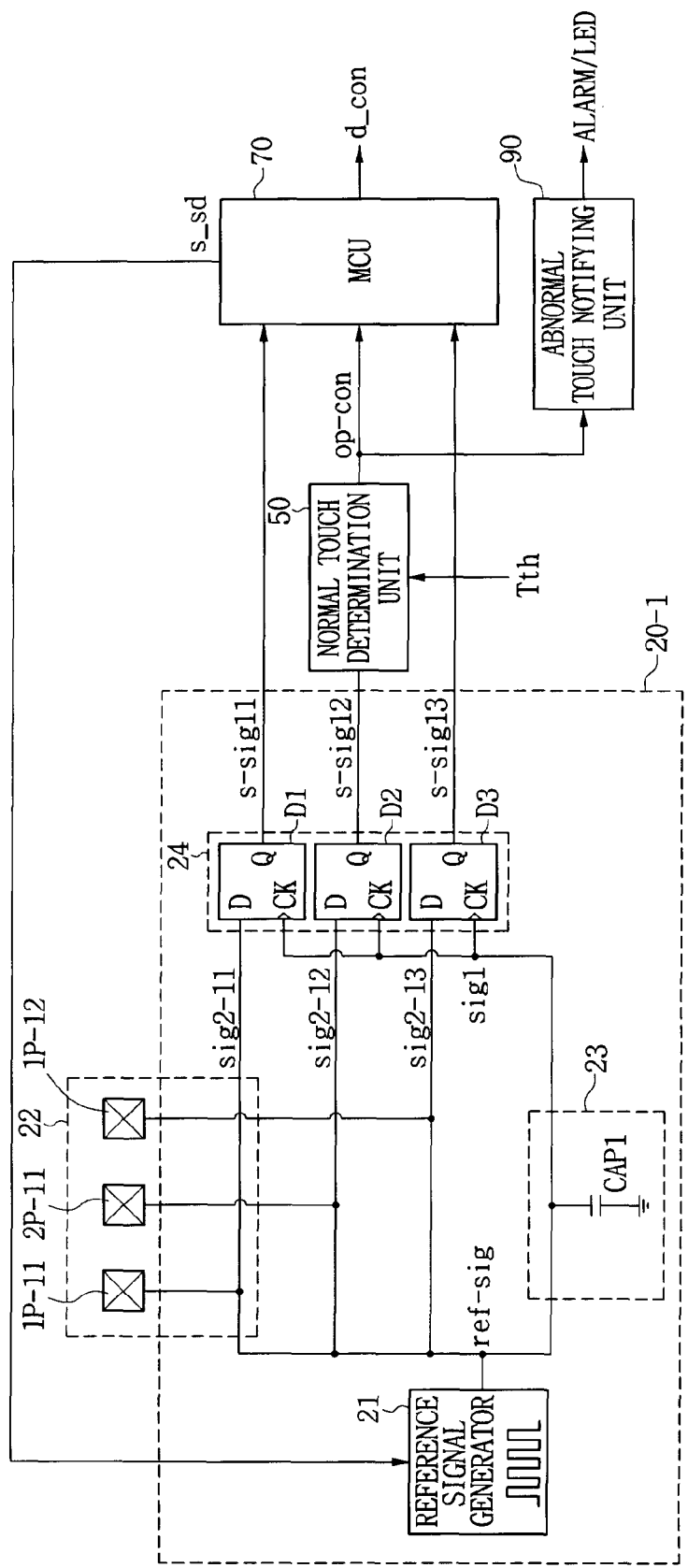
FIG. 3 is a block diagram of the touch sensor device in accordance with the exemplary embodiment of the present invention.

FIG. 3 is a block diagram of the touch sensor device in accordance with an exemplary embodiment of the present invention, the touch sensor device comprising a reference signal generator 21, a first signal generator 23, a second signal generator 22, a sensing signal generator 24, a normal touch determination unit 50, a micro-control unit (MCU) 70, and an abnormal touch notifying unit 90. The second signal generator 22 comprises a plurality of first touch pads 1P-11 and 1P-12 and a second touch pad 2P-11. The sensing signal generator 24 comprises a plurality of flip-flops D1 to D3.

The function of each block of the touch sensor device in accordance with the exemplary embodiment of the present invention will be described below with reference to FIG. 3.

The reference signal generator 21 generates a clock signal as a reference signal ref_sig.

The first signal generator 23 generates a first signal sig1 by delaying the reference signal ref_sig for a first period of time t1 regardless of whether there is a touch of the touch object.

The second signal generator 22 includes a plurality of first and second touch pads 1P-11, 1P-12, and 2P-11, which are touched by the touch object. The second signal generator 22 does not delay the reference signal ref_sig for more than the first period of time t1 when the touch object is not in contact with a touch pad 10 and generates second signals sig2-11 to sig2-13 by delaying the reference signal ref_sig for more than the first period of time t1 when the touch object is in contact with the touch pad 10.

That is, the second signal generator 22 generates second signals sig2-11 to sig2-13 having a phase faster than that of the first signal sig1 when the touch object is not in contact with the touch pad and generates second signals sig2-11 to sig2-13 having a phase slower than that of the first signal sig1 when the touch object is in contact with the touch pad.

Here, the touch object may include all objects having a predetermined electrostatic capacitance, and a typical example of the touch object is a human body.

The sensing signal generator 24 samples and latches the second signals sig2-11 to sig2-13 in synchronization with the first signal sig1 and generates a plurality of sensing signals s_sig11 and s_sig13.

The normal touch determination unit 50 receives the sensing signal s_sig12 output in response to the second electrical signal sig2-12 applied from the second touch pad 2P-11 among the plurality of sensing signals s_sig11 to s_sig13, determines whether the touch object is normally in contact with the corresponding touch pad by comparing a high level period with a predetermined threshold time Tth, and outputs an operation control signal op_con to control the function corresponding to the touch mark-key.

The MCU 70 receives the operation control signal op_con from the normal touch determination unit 50, outputs a control signal d_con to control an electronic device to perform the function corresponding to the touched touch pad in response to a high level, and outputs a shutdown signal s_sd so that the reference signal generator 21 does not generate a clock signal in response to a low level.

The abnormal touch notifying unit 90 receives the operation control signal op_con from the normal touch determination unit 50 and notifies the user that the touch pad 10 is abnormally touched by the touch object by an audible alarm or a visible light-emitting diode (LED) in response to the low level.

Figure 4:
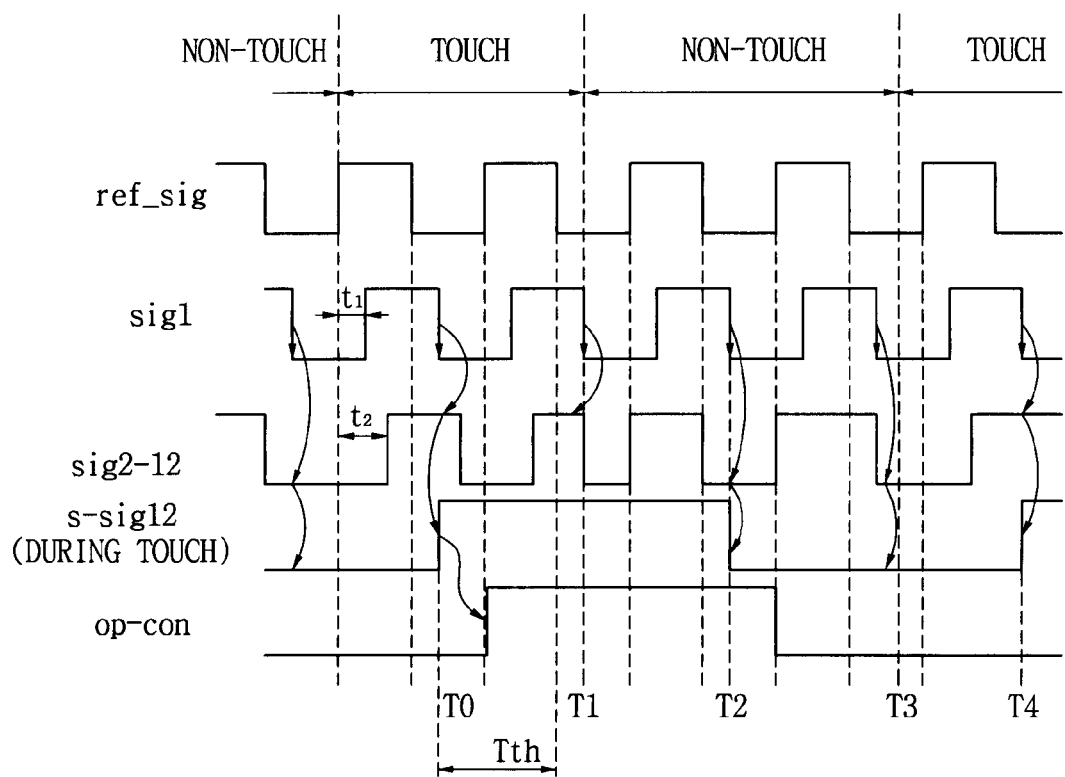
FIG. 4 is a signal flow diagram of the touch sensor device in accordance with another aspect of the exemplary embodiment of the present invention of FIG. 3.

FIG. 4 is a signal flow diagram of the touch sensor device in accordance with another aspect of the exemplary embodiment of the present invention of FIG. 3, in which a reference signal ref_sig, a first signal sig1, a second signal sig2-12, a sensing signal s_sig12 during normal touch, a sensing signal s_sig12 during abnormal touch, and an operation control signal op_con are used.

The reference signal ref_sig is toggled with a predetermined amplitude and period.

The first signal sig1 is delayed from the reference signal ref_sig by a first period of time t1 and toggled with the same amplitude and period as the reference signal ref_sig.

The second signal sig2-12 is delayed from the reference signal ref_sig by a second period of time t2 and toggled during touch, and is toggled in the same manner as the reference signal ref_sig during non-touch.

The sensing signal s_sig12 during normal touch is output at a high level maintained for a period of time longer than the threshold time Tth during touch as the second signal sig2-12 is latched in synchronization with a falling edge of the first signal sig1.

The operation control signal op_con is delayed for a predetermined time in response to the sensing signal s_sig12 during normal touch and then output.

The operation of the touch sensor device in accordance with another aspect of the exemplary embodiment of the present invention will be described with reference to FIGS. 3 and 4 below.

The first signal generator 23 generates a first signal sig1 by delaying the reference signal ref_sig by a first period of time t1 according to a first capacitor CAP1, and the second signal generator 22 generates a second signal sig2-12 delayed for a period of time t2 longer than the first period of time t1 according to the electrostatic capacitance of a touch object.

That is, during touch of the touch object, the phase of the second signal sig2-12 is slower than that of the first signal sig1, and thus the second signal sig2-12 is delayed more than the rising edge or falling edge of the first signal sig1. During non-touch of the touch object, the reference signal ref_sig is output as is without delay time.

Therefore, at an early stage, the sensing signal generator 24 latches the second signal sig2-12 at a low level in synchronization with the falling edge of the first signal sig1 and outputs a sensing signal s_sig12 at a low level during a first non-touch. And, during a normal first touch, the sensing signal generator 24 latches the second signal sig2-12 at a high level in synchronization with the falling edge of the first signal sig1 and outputs a sensing signal s_sig12 at a high level until time point T2.

Moreover, during a second non-touch, the sensing signal generator 24 latches the second signal sig2-12 at a low level again and outputs a sensing signal s_sig12 at a low level at time points T2 to T4. And, during a normal second touch, the sensing signal generator 24 latches the second signal sig2-12 at a high level again and outputs a sensing signal s_sig12 at a high level from time point T4.

However, as an example of the abnormal touch, in the case where the sensing signal s_sig12 has a period smaller than that set in accordance with the normal touch, the sensing signal s_sig12 is output as a pulse signal at a high level maintained for a period of time shorter than the threshold time Tth. The example of the abnormal touch is a case where a capacitance smaller than that of the normal touch is detected by the second touch pad 2P-11 because a portion of the finger touches to the location of the second touch pad 2P-11 or the finger is approximate to the location of the second touch pad 2P-11.

As another example, in the case where a duster is quickly brushed over the plurality of touch pads 1P-11 and 1P-12 to 1P-N1 and 1P-N2, and 2P-11 to 2P-N1 of FIG. 2 to remove foreign substances from the touch mark-keys on an electric household appliance, since the touch object is in contact with the touch pads 1P-11 and 1P-12 to 1P-N1 and 1P-N2, and 2P-11 to 2P-N1 for less than a predetermined time, albeit briefly, the sensing signal generator 24 outputs a sensing signal as a pulse signal at a high level maintained for a period of time shorter than the threshold time Tth and having a period smaller than that set in accordance with the normal touch.

The normal touch determination unit 50 determines whether the touch object is normally in contact with the touch mark-key by receiving the sensing signal s_sig12 from the sensing signal generator 24 and comparing the high level period of the sensing signal s_sig12 with the predetermined threshold time Tth.

Since the high level period of the sensing signal s_sig12 is longer than the predetermined threshold time Tth, if the touch object is normally in contact with the touch mark-key, the normal touch determination unit 50 determines that the touch object is normally in contact with the touch mark-key and outputs an operation control signal op_con at a high level to control the electric household appliance to perform the function assigned to the corresponding touch mark-key.

The MCU 70 outputs a device control signal d_con to control the electric household appliance to perform the predetermined function corresponding to the touch pad that the user intended to touch in response to the operation control signal op_con at a high level from the normal touch determination unit 50.

However, if the high level period of the sensing signal s_sig12 is shorter than the predetermined threshold time Tth when the touch object is abnormally in contact with the touch mark-key, the normal touch determination unit 50 determines that the touch object is abnormally in contact with the touch mark-key, ignores the sensing signal s_sig12, and outputs an operation control signal op_con at a low level to control the electric household appliance not to perform the function assigned to the corresponding touch mark-key.

In response to the operation control signal op_con at the low level output from the normal touch determination unit 50, the MCU 70 outputs a shutdown signal s_sd so that the reference signal generator 21 does not generate a clock signal, and the abnormal touch notifying unit 90 notifies the user that the touch pad 10-N is abnormally touched by the touch object by an audible alarm or a visible LED.

At this time, the reference signal generator 21, in which the operation is shut down by the shutdown signal s_sd received from the MCU 70, may be restarted by inputting a password using the touch pads or by pressing a mechanical switch such as a reset switch (not shown).

As such, the touch sensor device in accordance with another aspect of the exemplary embodiment of the present invention can determine whether the touch object is normally in contact with the touch mark-key by comparing the high level period of the sensing signal s_sig12 with the predetermined threshold time Tth, thus preventing malfunction due to the touch mark-key being abnormally touched contrary to the user's intention.

Moreover, the touch sensor device in accordance with another aspect of the exemplary embodiment of the present invention can determine whether the touch object is normally in contact with the touch mark-key by comparing the high level period of the sensing signal s_sig12 with a predetermined maximum touch time or a result value of automatic impedance calibration to detect the presence of foreign substances.

Up to now, the high level and the low level are used for simplicity of description. It is natural to replace the high level with the low level in an actual implementation.

Figure 5:
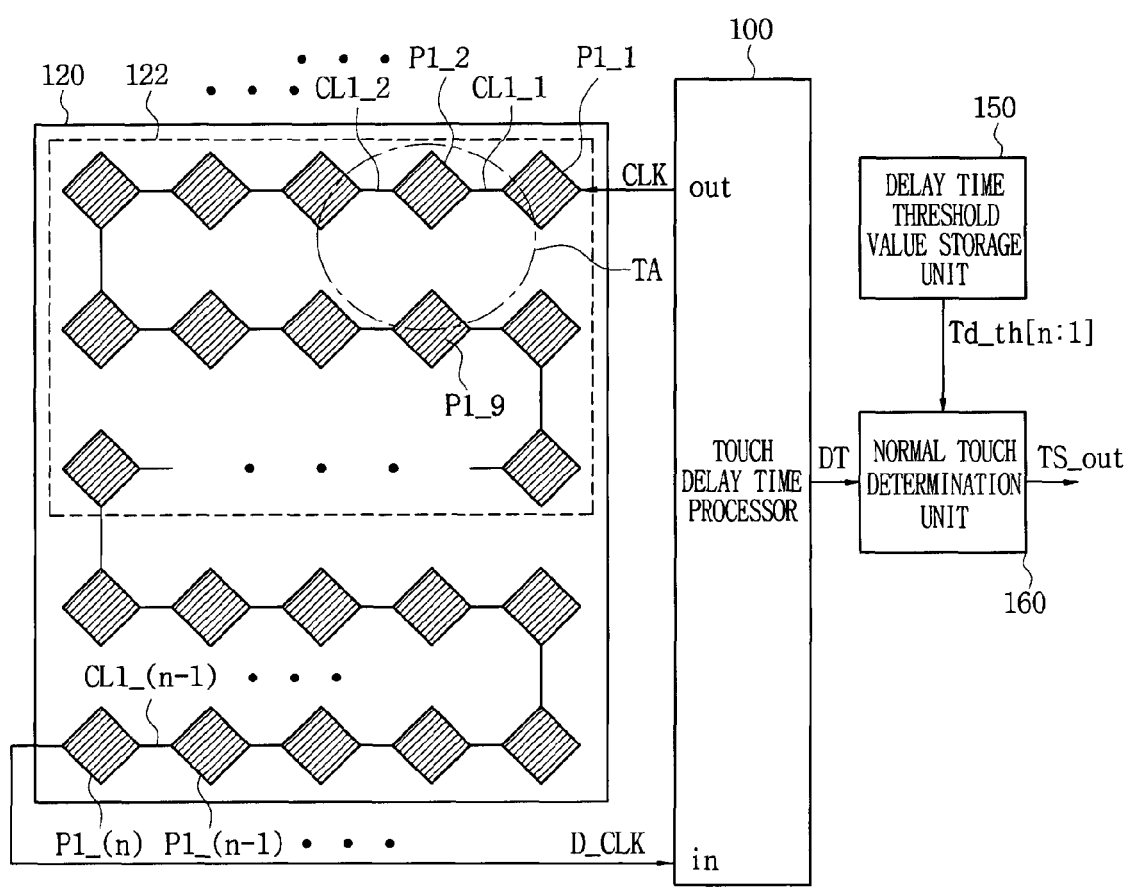
FIG. 5 shows the constitution of a touch sensor device in accordance with another exemplary embodiment of the present invention.

Next, FIG. 5 shows the constitution of a touch sensor device extended two-dimensionally in accordance with another exemplary embodiment of the present invention, the touch sensor device comprising a touch panel 120, a touch delay time processor 100, a delay time threshold value storage unit 150, and a normal touch determination unit 160.

In FIG. 5, a touch pattern is formed on one entire surface of the touch panel 120.

The touch pattern comprises a plurality of touch pads P1_1 to P1_(n) each having a predetermined resistance and a plurality of connecting lines CL1_1 to CL1_(n-1) having a predetermined resistance. The plurality of touch pads P1_1 to P1_(n) are connected in series by the connecting lines CL1_1 to CL1_(n-1). It is assumed that the touch area of the touch object is greater than the area of each of the plurality of touch pads P1_1 to P1_(n), and thus the touch object is in contact with four touch pads P1_1, P1_2, P1_3, and P1_9.

As shown in FIG. 5, each of the touch pads P1_1 to P1_(n), which are made to be large enough to allow the touch object to easily touch the touch pads, has a resistance smaller than that of the connecting lines CL1_1 to CL1_(n-1), which are narrow. Since the resistance of the touch pads P1_1 to P1_(n) is smaller than that of each of the connecting lines CL1_1 to CL1_(n-1), the touch position of the touch object is determined by the resistance of each of the connecting lines CL1_1 to CL1_(n-1) and the touch capacitance.

The touch delay time processor 100 includes a clock output pin (out) and a clock input pin (in), in which the clock output pin (out) is connected to the first touch pad P1_1 among the plurality of touch pads P1_1 to P1_(n) connected to the touch pattern in series, and the clock input pin (in) is connected to the last touch pad P1_(n).

The function of each block of the touch sensor device in accordance with another exemplary embodiment of the present invention will be described with reference to FIG. 5 below.

The touch delay time processor 100 generates and outputs a clock signal CLK to the first touch pad P1_1 through the clock output pin (out) and receives a delayed clock signal D_CLK delayed while passing through the plurality of touch pads P1_1 to P1_(n) through the clock input pin (in). Then, the touch delay time processor 100 calculates the position of the touch object in contact with the touch panel 120 using the delayed clock signal D_CLK input through the clock input pin (in) and outputs touch position data TS_OUT.

The delay time threshold value storage unit 150 stores touch delay time threshold values Td_th[n:1] of the plurality of touch pads P1_1 to P1_(n) to be compared with the actual touch delay time when the touch object is in contact with the touch panel 120.

The normal touch determination unit 160 detects the order in which the touch pads P1_1 to P1_(n) are temporally touched by receiving a delay time DT output from a comparing unit 140, which will be described later, thus determining the position of the touch pad which is first touched. Moreover, the normal touch determination unit 160 selects a touch pad in which the delay time is maintained for a predetermined time exceeding the first delay time threshold value, determines the touch pad that the user intended to touch, and output its coordinates as the touch position data TS_OUT.

Figure 6:
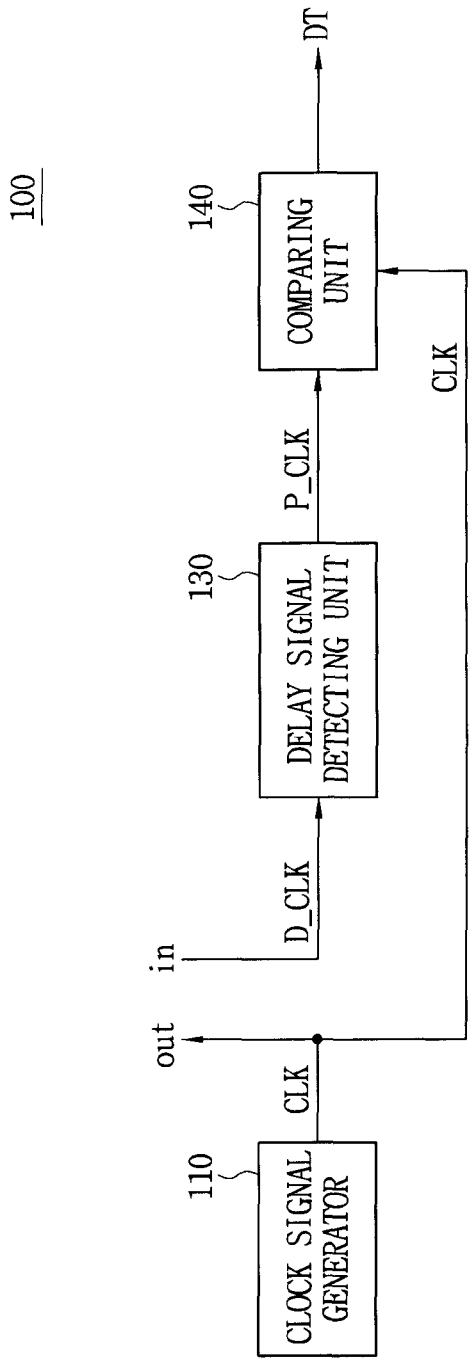
FIG. 6 is a block diagram of a touch delay time processor in the touch sensor device in accordance with the exemplary embodiment of the present invention of FIG. 5.

FIG. 6 is a block diagram of the touch delay time processor 100 in the touch sensor device in accordance with the exemplary embodiment of the present invention of FIG. 5, the touch delay time processor 100 comprising a clock signal generator 110, a delay signal detecting unit 130, and the comparing unit 140.

The function of each block of the touch sensor device in accordance with another exemplary embodiment of the present invention will be described with reference to FIGS. 5 and 6.

The clock signal generator 110 generates and outputs a clock signal CLK through the clock output pin (out).

At this time, the clock signal CLK input to the touch pad P1_1 passes through the plurality of touch pads P1_1 to P1_(n) and is output through the clock input pin (in). When the clock signal is input to the touch pattern, the clock signal CLK is delayed and distorted by the resistances of the plurality of touch pads P1_1 to P1_(n) and the plurality of connecting lines CL1_1 to CL1_(n-1), and by the electrostatic capacitance of the touch object in contact with the touch pads P1_1 to P1_(n), and thus a delayed clock signal D_CLK is output.

The delay signal detecting unit 130 receives the delayed clock signal D_CLK, detects the signal level of the delay clock signal D_CLK, and generates and outputs a pulse clock signal P_CLK.

The comparing unit 140 compares the pulse clock signal P_CLK received from the delay signal detecting unit 130 with the clock signal CLK received from the clock signal generator 110 and outputs a delay time DT of the pulse clock signal P_CLK relative to the clock signal CLK.

In the above description, the term "clock signal" has been used for convenience of understanding; however, it will be natural that the signal is not limited to the clock signal used in a specific system or semiconductor and means any digital signal that is periodically toggled for regular measurement.

Figure 7:
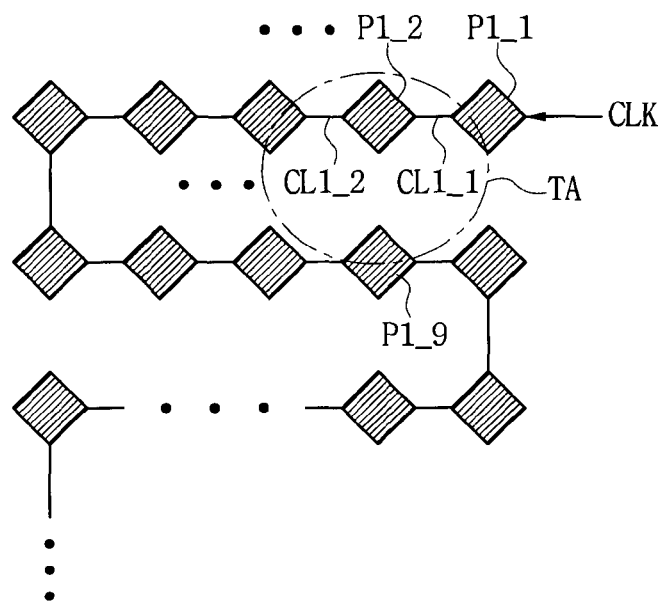
FIGS. 7 and 8 are diagrams showing two-dimensional patterns of a plurality of touch pads for reducing malfunction in the touch sensor device in accordance with another exemplary embodiment of the present invention.
Figure 8:
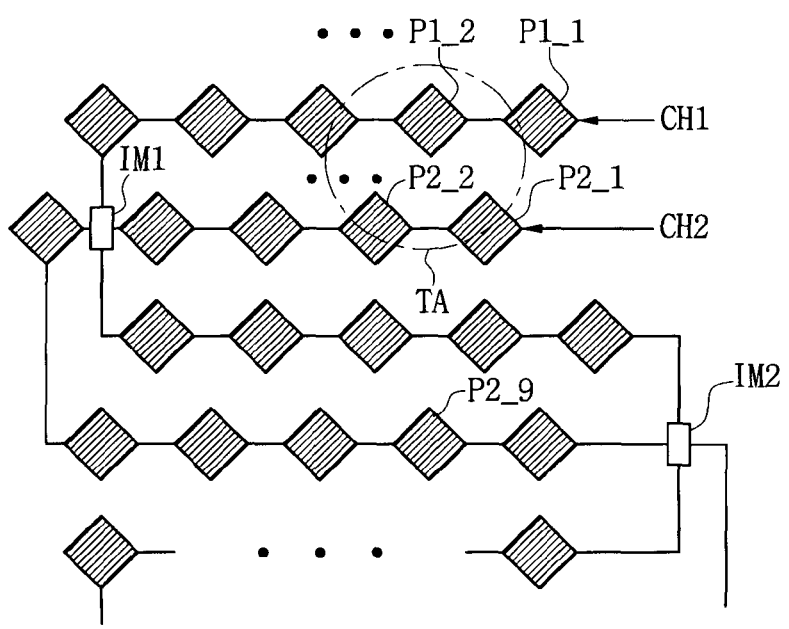

Next, FIGS. 7 and 8 are diagrams showing two-dimensional patterns of a plurality of touch pads for reducing malfunction in the touch sensor device in accordance with another exemplary embodiment of the present invention, in which a plurality of touch pads P1_1 to P1_(n), a plurality of connecting lines CL1_1 to CL1_(n-1), and a plurality of insulating materials IM1 and IM2 are provided.

In the touch pattern disposed on the touch panel shown in FIG. 5, the narrower the interval between the touch pads, the higher the resolution of the touch panel. However, incorrect touch data may be output when two or more touch pads are touched by the touch object at a time.

That is, in the touch pattern of FIG. 7, if the touch area of the touch object is greater than area of each touch pad, the initial touch area gradually increases and, thus, if the touch area on the touch pattern is TA, it is determined that the touch object is in contact with four touch pads P1_1, P1_2, P1_3, and P1_9 in the conventional touch sensor device. Therefore, the normal touch determination unit 160 of the present invention determines that the touch object is abnormally in contact with the touch pattern by detecting that the range of the estimated delay time according to the resistances of the respective touch pads is exceeded.

Thus, the normal touch determination unit 160 of FIG. 5 detects the chronological order in which the touch pads are touched using a difference in the applied delay time DT and using the touch delay time threshold values Td_th[n:1] of the plurality of touch pads P1_1 to P1_(n) applied from the delay time threshold value storage unit 150 and determines the position of the touch pad which was first touched, thus deciding the touch pad that the user intended to touch.

For example, if the touch area on the touch pattern is TA in FIG. 7, first, the touch pad P1_2 is touched, and thereafter, the touch pad P1_1, the touch pad P1_3, and the touch pad P1_9 are sequentially touched.

That is, in the conventional touch sensor device, it is determined that the touch object is in contact with four touch pads P1_1, P1_2, P1_3, and P1_9; however, the normal touch determination unit 160 of the present invention receives the delay times DT1, DT2, DT3, and DT9, which are time differences between the clock signals D_CLK1, D_CLK2, D_CLK3, and D_CLK9 delayed by the four touch pads P1_1, P1_2, P1_3, and P1_9 and the clock signal CLK, detects the chronological order in which the touch pads P1_1, P1_2, P1_3, and P1_9 are touched based on the touch delay time threshold values Td_th[1:3] and Td_th[9] of the touch pads P1_1, P1_2, P1_3, and P1_9, and determines the position of the touch pad P1_2 which was touched first.

Assuming that the resistance of the touch object is smaller than that of the plurality of connecting lines CL1_1 to CL1_(n-1), the delay times DT1, DT2, DT3, and DT9 are determined by the resistance of the plurality of connecting lines CL1_1 to CL1_(n-1). Thus, if the touch area is increased to the adjacent touch pads P1_1 and P1_3 after the touch pad P1_2 is touched, the resistance of the connecting lines is reduced, and thus the delay time is reduced from the delay time DT2 to the delay time DT1.

Then, even if the touch area gradually increases to the touch pad P1_9, since the touch area includes the touch pads P1_1 and P1_3, the delay time DT1 still remains.

The normal touch determination unit 160 recognizes the fact that the first touch is made on the touch pad P1_2 by comparing the delay times DT1, DT2, DT3, and DT9 with the touch delay time threshold values Td_th[1:3] and Td_th[9], determines the touch pad that the user intended to touch, and outputs its coordinates as the touch position data TS_OUT.

Moreover, as shown in FIG. 8, the touch sensor device in accordance with another exemplary embodiment of the present invention can prevent the plurality of touch pads from being touched on the same channel at the same time by arranging pattern lines CH1 and CH2 of two channels in parallel on the same surface of the touch panel.

Since the first and second touch patterns CH1 and CH2 are arranged in parallel, each of the first touch pattern CH1 and the second touch pattern CH2 ensures a sufficient distance between the plurality of touch pads such that the plurality of touch pads P1_1 to P1_(n) of the first touch pattern CH1 or the plurality of touch pads P2_1 to P2_(n) of the second touch pattern CH1 can be prevented from being touched by the touch object at the same time.

When the two touch patterns CH1 and CH2 are arranged in parallel, an insulating material is used to insulate two connecting lines at each intersecting point BP where one of the connecting lines CL1_1 to CL1_(n-1) of the first touch pattern CH1 intersects one of the connecting lines CL2_1 to CL2_(n-1) of the second touch pattern CH2, thus preventing the two connecting lines from being short-circuited. Here, as the insulating material, a bypass conductive material is used when the two touch patterns are arranged on a single layer, and a via-hole is used when they are arranged on two layers.

When the pattern lines CH1 and CH2 having different channels are arranged, the normal touch determination unit 160 of FIG. 5 calculates the positions P1_2 and P2_2 on the respective channels in the same manner as in FIG. 7 and determines that the touch is effectively made in one touch area only if the respective touch positions have a difference of a predetermined distance or less on the coordinate plane.

Therefore, since the second touch pad P1_2 of the first channel CH1 and the ninth touch pad P2_9 of the second channel CH2 have a difference of more than a predetermined distance on the plane, it is not recognized that the touch is an effective one.

Although two touch patterns CH1 and CH2 are shown in FIG. 8, it is possible to arrange pattern lines of three or more channels on the same surface of the touch panel in parallel, thus completely preventing a plurality of touch pads from being touched on the same channel at the same time. Moreover, it is possible to increase the resolution of the touch panel by reducing the distance between the respective channels.

Moreover, it is possible to detect an abnormal touch by arranging all the touch pads P1_1 to P1_(n) of FIG. 7 in another structure. Although the two touch patterns CH1 and CH2 have the same structure for convenience of description; it is needless to say that the second channel CH2 has a similar structure to the second touch pad 2P-11 of FIG. 2 in the case where the second channel CH2 is used for the purpose of detecting an abnormal touch.

Since the touch panel device using the plurality of channels and a method for detecting a touch position thereof are disclosed in Korean Patent Publication No. 10-2008-0064100, a detailed description of the operation method of the touch panel device will be omitted herein.

Figure 9:
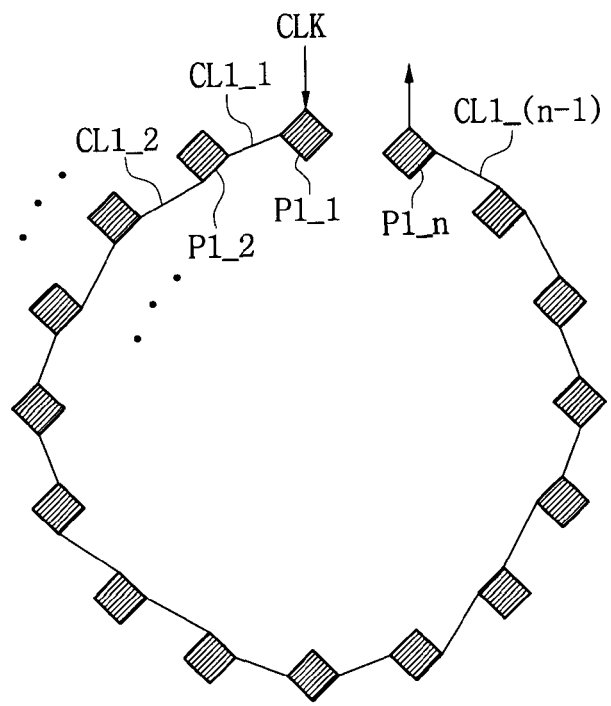
FIGS. 9 and 10 are diagrams showing circular patterns of a plurality of touch pads for reducing malfunction in the touch sensor device in accordance with still another exemplary embodiment of the present invention.
Figure 10:
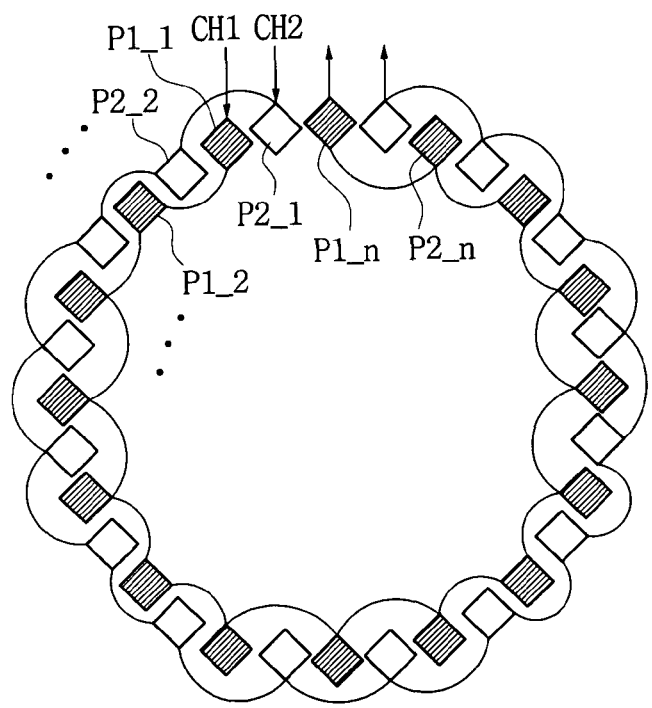

Next, FIGS. 9 and 10 are diagrams showing circular patterns of a plurality of touch pads for reducing malfunction in the touch sensor device in accordance with still another exemplary embodiment of the present invention, in which a plurality of touch pads P1_1 to P1_(n) and a plurality of connecting lines CL1_1 to CL1_(n-1) are provided.

If the distance between the touch pads is reduced to increase the resolution of the touch panel shown in FIG. 5, the plurality of touch pads may be simultaneously touched by the touch object. Thus, in order to overcome such limitations, the plurality of touch pads P1_1 to P1_(n) are arranged circularly with a predetermined curvature, and the distance between the touch pads P1_1 to P1_(n) is widened using the connecting lines CL1_1 to CL1_(n-1) in the present embodiment.

Here, since the connecting lines CL1_1 to CL1_(n-1) connecting the plurality of touch pads P1_1 to P1_(n) have the same resistance and a small width, the resistance is greater than that of each of the plurality of touch pads P1_1 to P1_(n).

FIG. 10 shows a structure in which the circular pattern of the plurality of touch pads of FIG. 9 is arranged as a first channel CH1, and a circular pattern of a plurality of touch pads P2_1 to P2_(n) is added as a second channel CH2 such that the precision of rotational curvature of the plurality of touch pads is increased.

Although two touch patterns CH1 and CH2 are shown in FIG. 10, it is possible to arrange pattern lines of three or more channels on the same surface of the touch panel in parallel, thus completely preventing a plurality of touch pads from being touched on the same channel at the same time. Moreover, it is possible to increase the resolution of the touch panel by reducing the distance between the respective channels.

Furthermore, it is needless to say that the second channel CH2 of FIG. 10 can be used in the same manner as the second touch pad 2P-11 of FIG. 3 to determine the effectiveness of the touch by detecting an abnormal touch.

Figure 11:
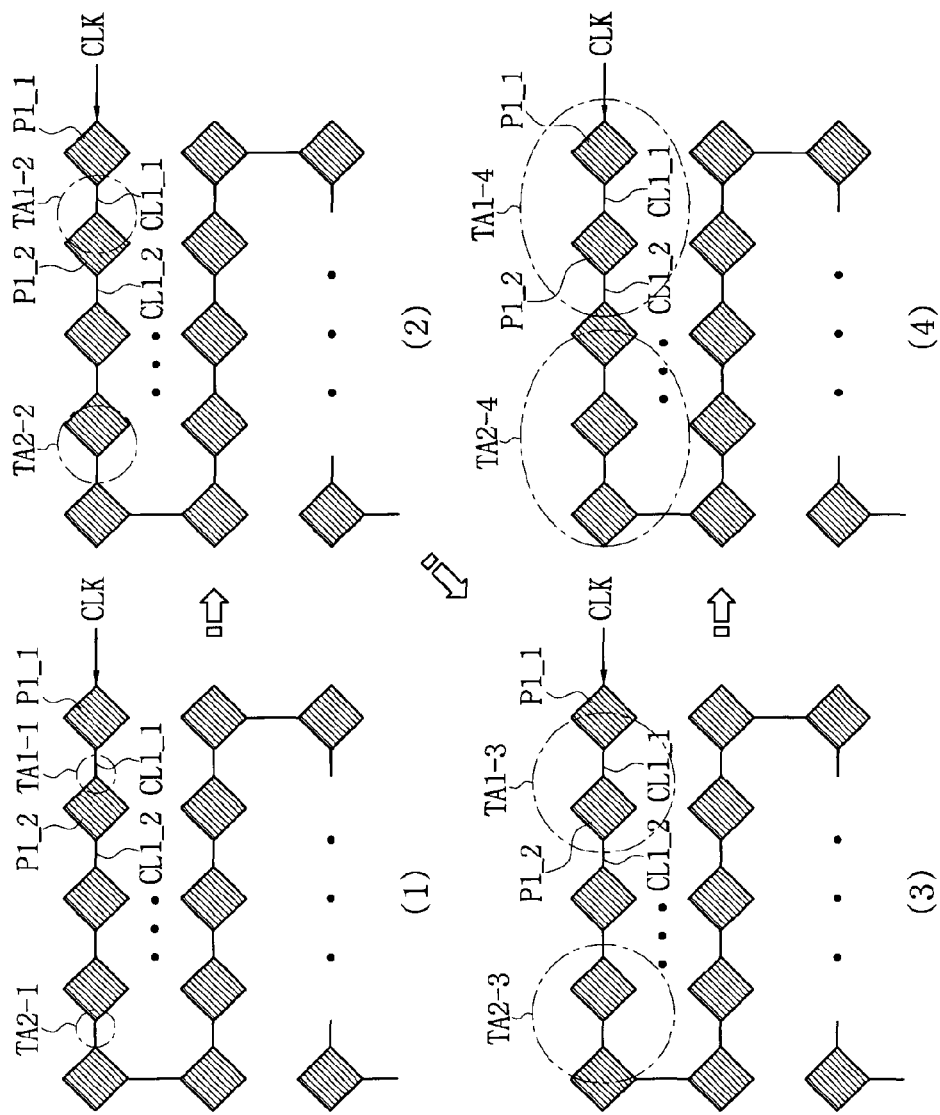
FIG. 11 is a diagram showing a two-dimensional pattern of a plurality of touch pads for reducing malfunction by the amount of delay time and showing a change in touch area with the passage of touch time in the touch sensor device in accordance with another aspect of still another exemplary embodiment of the present invention.

Next, FIG. 11 is a diagram showing a two-dimensional pattern of a plurality of touch pads for reducing malfunction by the amount of delay time and showing a change in touch area with the passage of touch time in a touch sensor device in accordance with another aspect of still another exemplary embodiment of the present invention, in which a plurality of touch pads P1_1 to P1_(n) and one channel are provided.

FIG. 11 shows that two touch cases of TA1-N and TA2-N are present on the touch panel, in which (1) of FIG. 11 shows the case in which the touch object is in contact with a portion of each of the touch pads P1_2 and P1_4 at the touch areas TA1-1 and TA2-1, (2) of FIG. 11 shows the case in which each of the touch areas TA1-2 and TA2-2 is in contact with each of the touch pads P1_2 and P1_4, and (3) and (4) of FIG. 11 show the case in which the touch areas TA1-3 and TA2-3, and TA1-4 and TA2-4, respectively, are increased to be in contact with adjacent touch pads P1_1 and P1_5, and P1_1, P1_3 and P1_5, respectively.

As shown in FIG. 11, when the touched states are compared with respect to time, in (3) and (4) of FIG. 11, in which a considerable time has elapsed, the touch areas are greatly increased to the adjacent touch pads P1_1, P_3, and P_5, and thus it is impossible to accurately recognize the touch pads P1_2 and P1_4 that the user intended to touch.

Figure 12:
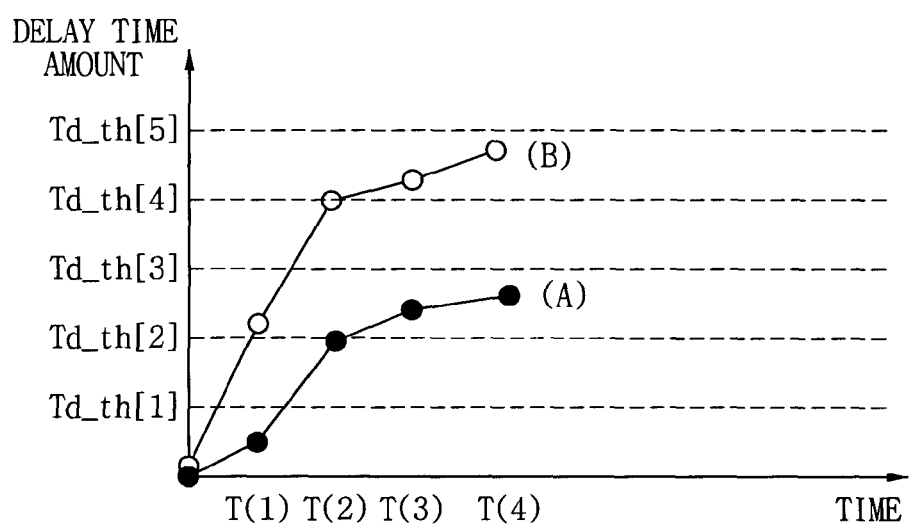
FIG. 12 is a graph showing a change in delay time according to touch positions with the passage of touch time of a touch object in the touch sensor device in accordance with another aspect of still another exemplary embodiment of the present invention.

FIG. 12 is a graph showing a change in delay time according to touch positions with the passage of touch time of the touch object in FIG. 11, in which an X axis represents the time during which the touch object is in contact with the touch pads and a Y axis represents the amount of delay time according to the touch positions of the plurality of touch pads.

In FIG. 12, (A) corresponds to the case where the touch object is in contact with the touch area TA1-N in FIG. 9. Here, while the delay time is less than the touch delay time threshold value Td_th[1] of the first touch pad P1_1 at time point T(1), the delay time is increased to the touch delay time threshold value Td_th[2] of the second touch pad P1_2 at time point T(2), increased again to more than the touch delay time threshold value Td_th[2] of the second touch pad P1_2 at time point T(3), and maintained above the touch delay time threshold value Td_th[2] of the second touch pad P1_2 at time point T(4).

Moreover, (B) of FIG. 12 corresponds to the case where the touch object is in contact with the touch area TA2-N in FIG. 11. Here, while the delay time is more than the touch delay time threshold value Td_th[2] of the second touch pad P1_2 at time point T(1), the delay time is increased to the touch delay time threshold value Td_th[4] of the fourth touch pad P1_4 at time point T(2), increased again to more than the touch delay time threshold value Td_th[4] of the fourth touch pad P1_4 at time point T(3), and maintained above the touch delay time threshold value Td_th[4] of the fourth touch pad P1_4 at time point T(4).

While the touch areas of the touch object are all extended to the adjacent touch pads after time point T(3) in both cases (A) and (B) of FIG. 12, the increment of the touch delay time is reduced. Thus, it can be determined that the touch object is in contact with the second touch pad P1_2 in the case of FIG. 12 (A) and the touch object is in contact with the fourth touch pad P1_4 in the case of FIG. 12 (B) based on the touch pads in which the touch threshold value is exceeded and according to whether the increment of the delay time is reduced.

The operation of reducing malfunction due to an abnormal touch with the change in the touch area according to the passage of touch time of the plurality of touch pads P1_1 to P1_(n) will be described with reference to FIGS. 5, 6, 11, and 12 below.

First, in FIGS. 5 and 6, the delay time threshold value storage unit 150 stores touch delay time threshold values Td_th[n:1] of the plurality of touch pads P1_1 to P1_(n) to be compared with the actual touch delay time when the touch object is in contact with the plurality of touch pads P1_1 to P1_(n).

Referring to (A) of FIG. 10, the touch object is in contact with the touch areas TA1-N and TA2-N in (1) of FIG. 11 at time point T(1). Since the touch areas TA1-1 and TA2-1 start from the starting point during non-touch and the touch delay time is smaller than the touch delay time threshold value Td_th[1] of the first touch pad P1_1, the normal touch determination unit 160 determines that the touch object is not in contact with the first touch pad P1_1. Referring to (B) of FIG. 12, since the touch delay time is greater than the touch delay time threshold value Td_th[2] of the second touch pad P1_2, the normal touch determination unit 160 determines that the touch object is in contact with the second touch pad P1_2.

In the case where the touch object is in contact with the touch areas TA1-N and TA2-N at time point T(2) in (2) of FIG. 11, in which the touch areas are increased after a predetermined time has elapsed from time point T(1), each of the touch areas TA1-2 and TA2-2 corresponds to the area of each of the touch pads.

In the case of the touch area TA1-N, referring to (A) of FIG. 12, the touch delay time is increased to the touch delay time threshold value Td_th[2] of the second touch pad P1_2, and thus the normal touch determination unit 160 determines that the touch object is in contact with the second touch pad P1_2.

In the case of the touch area TA2-N, referring to (B) of FIG. 12, the touch delay time is increased to the touch delay time threshold value Td_th[4] of the fourth touch pad P1_4, and thus the normal touch determination unit 160 determines that the touch object is in contact with the fourth touch pad P1_4.

In (3) and (4) of FIG. 11, in which the touch areas are greatly increased after a predetermined time has elapsed from time point T(2), the touch areas are extended to the adjacent touch pads.

In the case of the touch area TA1-N, referring to (A) of FIG. 12, the touch delay time is increased to more than the touch delay time threshold value Td_th[2] of the second touch pad P1_2 and maintained continuously, and thus the normal touch determination unit 160 accurately determines that the touch object is in contact with the second touch pad P1_2.

In the case of the touch area TA2-N, referring to (B) of FIG. 12, the touch delay time is increased to more than the touch delay time threshold value Td_th[4] of the fourth touch pad P1_4 and maintained continuously, and thus the normal touch determination unit 160 accurately determines that the touch object is in contact with the fourth touch pad P1_4.

As such, the touch sensor device in accordance with another aspect of still another exemplary embodiment of the present invention selects the touch pad in which the touch delay time delivering the sensing signal of the touch object exceeds the first threshold delay time and is maintained for a predetermined time, thus determining an accurate touch position of the touch object.

The foregoing description of the exemplary embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

The invention claimed is:

1. A touch sensor device, comprising:
a touch panel including a plurality of touch keys indicating a position touched by a touch object;
a plurality of first touch pads disposed at positions corresponding to the plurality of touch keys of the touch panel and generating touch information of the touch object as a first electrical signal;
a plurality of second touch pads disposed adjacent the plurality of first touch pads and generating touch information of a conductive material on the touch object as a second electrical signal, each of the plurality of second touch pads not having a corresponding touch key; and
a touch sensing unit receiving the first electrical signal, outputting a plurality of sensing signals to allow an electronic device to perform predetermined operations corresponding to the touched touch keys, and determining whether the touch of the touch object is a normal one using the first and second electrical signals.

2. The touch sensor device of claim 1, wherein the touch sensing unit comprises:
a touch sensor generating a measurement digital signal, a first signal by delaying the measurement digital signal for a first period of time, and a second signal by delaying the measurement digital signal for more than the first period of time during touch of the touch object, and latching the second signal in synchronization with the first signal, thus generating the plurality of sensing signals; and
a normal touch determination unit determining that the touch of the touch object is an abnormal one when a plurality of the first electrical signals and the second electrical signal are received, and outputting an operation control signal to ignore the plurality of first electrical signals.

3. The touch sensor device of claim 2, wherein the normal touch determination unit determines that the touch of the touch object is a normal one when the first electrical signal is received from one of the plurality of first touch pads and the second electrical signal is received from one of the plurality of second touch pads, or when the first electrical signal is received from another one of the plurality of first touch pads and the second electrical signal is received from one second touch pad.

4. The touch sensor device of claim 2, wherein the normal touch determination unit determines whether the touch of the touch object is a normal one by receiving a sensing signal output in response to the second electrical signal among the plurality of sensing signals and comparing a high level period with a predetermined threshold time, outputs the operation control signal at a high level during normal touch in which the high level period is longer than the predetermined threshold time, and outputs the operation control signal at a low level during abnormal touch in which the high level period is shorter than the threshold time.

5. The touch sensor device of claim 4, wherein the normal touch determination unit detects the abnormal touch by selecting a sensing signal having a period shorter than that of the plurality of sensing signals during the normal touch and maintained at a high level for a period of time shorter than the predetermined threshold time during the abnormal touch.

6. The touch sensor device of claim 5, wherein the touch sensor comprises:
a reference signal generator generating the measurement digital signal as a reference signal;
a first signal generator generating the first signal by delaying the reference signal for the first period of time regardless of whether there is a touch of the touch object;
a second signal generator not delaying the reference signal when there is no touch from the touch object and generating the second signal when there is a touch of the touch object; and
a sensing signal generator latching the second signal in synchronization with the first signal and generating the plurality of sensing signals.

7. The touch sensor device of claim 6, further comprising:
a micro-control unit (MCU) controlling the electronic device to perform the predetermined function in response to the operation control signal or shutting down the generation of the reference signal; and
an abnormal touch notifying unit notifying that the plurality of first touch pads are abnormally touched in response to the operation control signal.

8. The touch sensor device of claim 7, wherein the MCU outputs a device control signal to control the electronic device to perform the predetermined operation in response to the operation control signal at a high level and outputs a shutdown signal so that the reference signal generator does not generate the reference signal in response to the operation control signal at a low level.

9. The touch sensor device of claim 8, wherein the plurality of first touch pads are used for the electronic device to perform the predetermined operations, and the plurality of second touch pads are used for the touch sensing unit to detect the abnormal touch.

10. The touch sensor device of claim 7, wherein the abnormal touch notifying unit notifies the abnormal touch state by an audible alarm or a visible light-emitting diode (LED) in response to the operation control signal at a low level.

11. The touch sensor device of claim 8, wherein the touch sensor device requires an input of a password to restart the reference signal generator in which the generation of the reference signal is shut down.

12. The touch sensor device of claim 8, further comprising:
a reset switch resetting the shutdown signal to restart the reference signal generator in which the generation of the reference signal is shut down.

13. The touch sensor device of claim 6, wherein the normal touch determination unit detects the presence of foreign substances by comparing the high level periods of the plurality of sensing signals with a predetermined maximum touch time or a result value of automatic impedance calibration, thus determining the abnormal touch.

14. A touch sensor device, comprising:
a touch panel including a touch pattern in which a plurality of touch pads are connected in series by a connecting line;
a touch delay time processor generating and applying a measurement digital signal to one end of the touch pattern, generating a pulse measurement digital signal by receiving a delayed measurement digital signal delayed while passing through the plurality of touch pads from the other end of the touch pattern, and outputting a delay time difference between the pulse measurement digital signal and the measurement digital signal;
a delay time threshold value storage unit storing touch delay time threshold values of the plurality of touch pads to be compared with actual touch delay times and the delay time difference during touch of a touch object; and
a normal touch determination unit detecting a chronological order in which the plurality of touch pads are touched, by receiving the delay time difference and comparing the delay time difference with the touch delay time threshold values, detecting a position of the touch pad which was first touched, and outputting touch position data.

15. The touch sensor device of claim 14, wherein the touch delay time processor comprises:
a measurement digital signal generator generating and outputting the measurement digital signal through a measurement digital output pin;
a delay signal detecting unit generating the pulse measurement digital signal by receiving the delayed measurement digital signal through a measurement digital input pin and detecting a signal level of the delayed measurement digital signal; and
a comparing unit receiving and comparing the pulse measurement digital signal and the measurement digital signal and outputting the delay time difference.

16. The touch sensor device of claim 14, wherein the touch pattern has a structure in which the plurality of touch pads are arranged in a two-dimensional layout to reduce malfunction caused when the touch object is abnormally in contact with a touch pad adjacent to the touch pad that the touch object is intended to touch because a touch area of the touch object is greater than the area of each of the plurality of touch pads or the touch area of the touch object gradually increases with the passage of time.

17. The touch sensor device of claim 16, wherein the touch panel comprises:
pattern lines of a plurality of channels disposed in parallel at a sufficient distance from each other on the same surface to prevent the plurality of touch pads from being simultaneously touched; and
an insulating material insulating the connecting lines at each intersecting point where the plurality of channels intersect each other to prevent the connecting lines from being short-circuited.

18. The touch sensor device of claim 17, wherein a bypass conductive material is used as the insulating material when the pattern lines of the plurality of channels are arranged on a single layer, and a via-hole is used as the insulating material when the pattern lines of the plurality of channels are arranged on two layers.

19. The touch sensor device of claim 17, wherein the normal touch determination unit calculates positions at which the touch object is in contact with the respective channels of the pattern lines and determines that the touch is effectively made in one touch area only if the touch positions have a difference of less than a predetermined distance on the coordinate plane.

20. The touch sensor device of claim 15, wherein, in the touch pattern, the plurality of touch pads are arranged circularly with a predetermined curvature by a circular layout to reduce malfunction due to an abnormal touch.

21. The touch sensor device of claim 20, wherein, in the touch panel, the plurality of touch pads are arranged in a circular pattern as a first channel, and a plurality of touch pads are arranged circularly between the plurality of touch pads with the same curvature such that the touch panel has the plurality of channels.

22. A touch sensor device, comprising:
a touch panel including a touch pattern in which a plurality of touch pads are connected in series by a connecting line;
a touch delay time processor generating and applying a measurement digital signal to one end of the touch pattern, generating a pulse measurement digital signal by receiving a delayed measurement digital signal delayed while passing through the plurality of touch pads from the other end of the touch pattern, and outputting a delay time difference between the pulse measurement digital signal and the measurement digital signal;
a delay time threshold value storage unit storing touch delay time threshold values of the plurality of touch pads to be compared with actual touch delay times and the delay time difference during touch of a touch object; and
a normal touch determination unit selecting a touch pad in which the delay time exceeds the touch delay time threshold value and is maintained for a predetermined time by receiving the touch delay time threshold values and comparing the touch delay time threshold values with the delay times, detecting a position of the touch pad which is first touched, and outputting touch position data.

23. The touch sensor device of claim 22, wherein the touch delay time processor comprises:
a measurement digital signal generator generating and outputting the measurement digital signal through a measurement digital output pin;
a delay signal detecting unit generating the pulse measurement digital signal by receiving the delayed measurement digital signal through a measurement digital input pin and detecting a signal level of the delayed measurement digital signal; and
a comparing unit receiving and comparing the pulse measurement digital signal and the measurement digital signal and outputting the delay time difference.

24. The touch sensor device of claim 23, wherein, when the touch area of the touch object is extended to an adjacent touch pad, the touch sensor device detects a position of the touch pad which is first touched based on the touch pad in which the touch delay time threshold value is exceeded and according to whether the increment of the delay time is reduced.

25. The touch sensor device of claim 24, wherein the touch sensor device detects a touch pad which is abnormally touched based on the delay time difference to reduce malfunction due to an abnormal touch.

* * * * *